(12) United States Patent
Zhao et al.

(10) Patent No.: US 10,809,395 B2
(45) Date of Patent: Oct. 20, 2020

(54) PHOTON MEASUREMENT FRONT-END CIRCUIT WITH INTEGRAL MODULE AND A NEGATIVE FEEDBACK MODULE

(71) Applicant: Wuhan Zhong Pai Technology Co., LTD., Wuhan (CN)

(72) Inventors: Zhixiang Zhao, Shanghai (CN); Qiu Huang, Shanghai (CN); Zheng Gong, Wuhan (CN)

(73) Assignee: Wuhan Zhong Pai Technology Co., LTD., Wuhan, Hubei (CN)

( * ) Notice: Subject to any disclaimer, the term of this patent is extended or adjusted under 35 U.S.C. 154(b) by 399 days.

(21) Appl. No.: 15/882,279

(22) Filed: Jan. 29, 2018

(65) Prior Publication Data

US 2018/0164446 A1 Jun. 14, 2018

Related U.S. Application Data

(63) Continuation of application No. PCT/CN2016/091679, filed on Jul. 26, 2016.

(30) Foreign Application Priority Data

Jul. 29, 2015 (CN) .......................... 2015 1 0459195

(51) Int. Cl.
*G01T 1/208* (2006.01)
*G01J 1/44* (2006.01)
(Continued)

(52) U.S. Cl.
CPC .............. *G01T 1/208* (2013.01); *G01J 1/44* (2013.01); *G01J 1/46* (2013.01); *G01T 1/2018* (2013.01);
(Continued)

(58) Field of Classification Search
CPC ......... G01T 1/208; G01T 1/20; G01T 1/2018; G01T 1/2985; G01J 1/46; G01J 1/44; G01J 2001/446
(Continued)

(56) References Cited

U.S. PATENT DOCUMENTS 4,825,077 A 4/1989 Tawil et al.
8,742,314 B2 * 6/2014 Tateishi .................... G01J 1/44
250/214 A

FOREIGN PATENT DOCUMENTS

CN 101231192 A 7/2008
CN 101533099 A 9/2009
(Continued)

OTHER PUBLICATIONS

International Search Report and Written Opinion for International Application No. PCT/CN2016/091679 dated Oct. 14, 2016.

*Primary Examiner* — Que Tan Le
(74) *Attorney, Agent, or Firm* — Wolf, Greenfield & Sacks, P.C.

(57) ABSTRACT

A photon measurement front-end circuit has an integral module for integrating the difference between an initial signal from a photoelectric detector and a feedback signal, and outputting an integral signal, a comparator for comparing the integral signal with a reference signal and generating a comparison result, a transmission controller for controlling the transmission of the comparison result by using a clock signal, in order to output a digital signal, a negative feedback module for converting the digital signal into the feedback signal and feeding the feedback signal back to the integral module, and a photon measurement module comprising an energy measurement module for measuring, by use of the digital signal, the energy of photons detected by the photoelectric detector. The photon measurement front-end circuit has a simple circuit structure and reduced power consump- (Continued)

tion and costs, and energy measurement is not affected by the starting time of the initial signal.

20 Claims, 9 Drawing Sheets

(51) Int. Cl.
*G01J 1/46* (2006.01)
*G01T 1/20* (2006.01)
*G01T 1/29* (2006.01)

(52) U.S. Cl.
CPC ....... G01T 1/2985 (2013.01); *G01J 2001/444* (2013.01)

(58) Field of Classification Search
USPC .......................................... 250/214 R, 214.1
See application file for complete search history.

(56) References Cited

FOREIGN PATENT DOCUMENTS

| | | |
|---|---|---|
| CN | 101551344 A | 10/2009 |
| CN | 103197339 A | 7/2013 |
| CN | 105022082 A | 11/2015 |
| CN | 105093258 A | 11/2015 |
| CN | 105572721 A | 5/2016 |
| JP | 2005-121392 A | 5/2005 |

\* cited by examiner

PHOTON MEASUREMENT FRONT-END CIRCUIT WITH INTEGRAL MODULE AND A NEGATIVE FEEDBACK MODULE

RELATED APPLICATIONS

This Application is a Continuation of International Application Serial No. PCT/CN2016/091679, filed on Jul. 26, 2016, entitled "PHOTON MEASUREMENT FRONT-END CIRCUIT," which claims foreign priority benefits under 35 U.S.C. § 119(a)-(d) or 35 U.S.C. § 365(b) of Chinese Application Number 201510459195.0, filed on Jul. 29, 2015. Both of these applications are incorporated herein by reference in their entireties.

FIELD OF THE ART

The present disclosure relates to the field of the electronic circuit, more particularly, to a photon measurement front-end circuit.

BACKGROUND

A front-end detector of a high-energy photon (X-ray, a gamma photon and so on) measurement system generally comprises three parts: a scintillator, a photoelectric detector and a photon measurement front-end circuit. A group of visible photons with lower energy is generated after a high-energy photon interacts with the scintillator. The photoelectric detector converts an optical signal carried by the group of visible photons into an electric signal. The photon measurement front-end circuit mainly serves the purpose of obtaining energy and arrival time of the high-energy photon by measuring the electric signal generated by the photoelectric detector. As an example, in a Positron Emission Tomography (PET) or a Single Photon Emission Computed Tomography (SPECT) system, a group of visible photons with lower energy is generated after a gamma photon interact with a scintillator (such as a LYSO crystal). A photoelectric detector (such as a PMT or a SiPM) converts an optical signal carried by the group of visible photons into an electric signal. A photon measurement front-end circuit measures the electric signal generated by the photoelectric detector to obtain energy and arrival time of the gamma photon.

FIG. 1 illustrates a schematic diagram of a conventional and exemplary photon measurement front-end circuit. As illustrated in FIG. 1, the photon measurement front-end circuit of a PET system comprises two parts for energy measurement and time measurement. A typical energy measurement circuit comprises a pulse shaping filter (i.e., a low-pass filter as shown in FIG. 1), an analog-digital convertor (ADC), and a summing circuit for energy measurement. The summing circuit is normally realized by a Field Programmable Gate Array (FPGA). A typical time measurement circuit comprises a high-speed pre-amplifier, a pulse rising edge detector (or a constant ratio detector or a zero-crossing detector, that is, the comparator as shown in FIG. 1), and a time-digital converter (TDC). In the conventional photon measurement front-end circuit, a channel needs at least three amplifiers, one TDC and one ADC. Such a measurement circuit is of a complicated structure, with high cost and power consumption. When a Silicon photo-multiplier (SiPM) array is used to form the photoelectric detector, it is even more complicated. An 8 by 8 array needs 64 channels, which is essentially impractical in terms of both cost and power consumption. Normally a resistor array is used to reduce the signal channels. But such a method cannot be applied to a scenario where each signal channel of the SiPM needs to be read out, for example, a photoelectric detector formed by a SiPM array and a whole block of crystal.

Moreover, in the conventional photon measurement front-end circuit, a current signal (hereafter referred to as "an initial signal") from the photoelectric detector is amplified and filtered. The amplified and filtered initial signal is then sampled by the ADC, and energy of the high-energy photon is then calculated as a function of a value of the sampled initial signal. As the initial signal is generally a pulse current signal, it has a random starting time, which is asynchronous with an ADC sampling clock. As a result, the energy computed by the ADC sampling is influenced by the starting time of the initial signal.

Therefore, it is needed to provide a photon measurement front-end circuit, which at least solves the above problem to a certain extent.

SUMMARY

In order to at least partially solve the problems in conventional technology, an aspect of the invention provides a photon measurement front-end circuit. The photon measurement front-end circuit comprises an integral module, a comparator, a transmission controller, a negative feedback module and a photon measurement module. The integral module is connected to an output terminal of a photoelectric detector and an output terminal of the negative feedback module and configured for receiving an initial signal from the photoelectric detector and a feedback signal from the negative feedback module, integrating a difference between the initial signal and the feedback signal, and outputting an integral signal. An input terminal of the comparator is connected to an output terminal of the integral module and the other input terminal of the comparator is connected to a reference level, and the comparator is configured for comparing the integral signal with the reference level and generating a comparison result. An input terminal of the transmission controller is connected to an output terminal of the comparator, and the transmission controller is configured for controlling transmission of the comparison result by use of a clock signal such that a digital signal is output, wherein a high level in the digital signal and with duration equal to a period of the clock signal represents a first logic level, and a low level in the digital signal and with duration equal to the period of the clock signal represents a second logic level. An input terminal of the negative feedback module is connected to an output terminal of the transmission controller, and the negative feedback module is configured for converting the digital signal into the feedback signal and feeding the feedback signal back to the integral module. The photon measurement module comprises an energy measurement module, and an input terminal of the energy measurement module is connected to the output terminal of the transmission controller, and the energy measurement module is configured for measuring, based on the digital signal, energy of a photon detected by the photoelectric detector.

The photon measurement front-end circuit provided by the invention has a simple circuit structure, with fewer or even no active devices used, thereby reducing the power consumption and the cost. Moreover, it differs from the method in the prior art which measures energy by the ADC sampling, in that the initial signal is integrated and then the integral signal is processed to obtain energy information of the photon in the photon measurement front-end circuit of the invention. As a result, the energy measurement is not affected by the starting time of the initial signal.

A series of simplified concepts are introduced in the invention, which will be explained in more detail in embodiments. The key features and the essential technical features of the claimed technical solutions of the invention are in no way limited by the contents thereof. The scope of protection of the claimed technical solutions is not limited by the description either.

The advantages and the features of the invention will be described in detail in the following with reference to the accompanying drawings.

BRIEF DESCRIPTION OF THE DRAWINGS

The following drawings of the invention are a part of the invention to facilitate the understanding thereof. Embodiments of the invention and descriptions thereof are shown in the accompanying drawings to explain the principles of the invention. In the drawings.

DETAILED DESCRIPTION

Numerous details are provided in the following description to enable a thorough understanding of the invention. However, it can be understood by those skilled in the art that the following description relates only to the preferred embodiments of the invention and that the invention may be practiced without one or more of such details. In addition, to avoid obscuring the invention, some technical features known in the art are not described.

Figure 1:
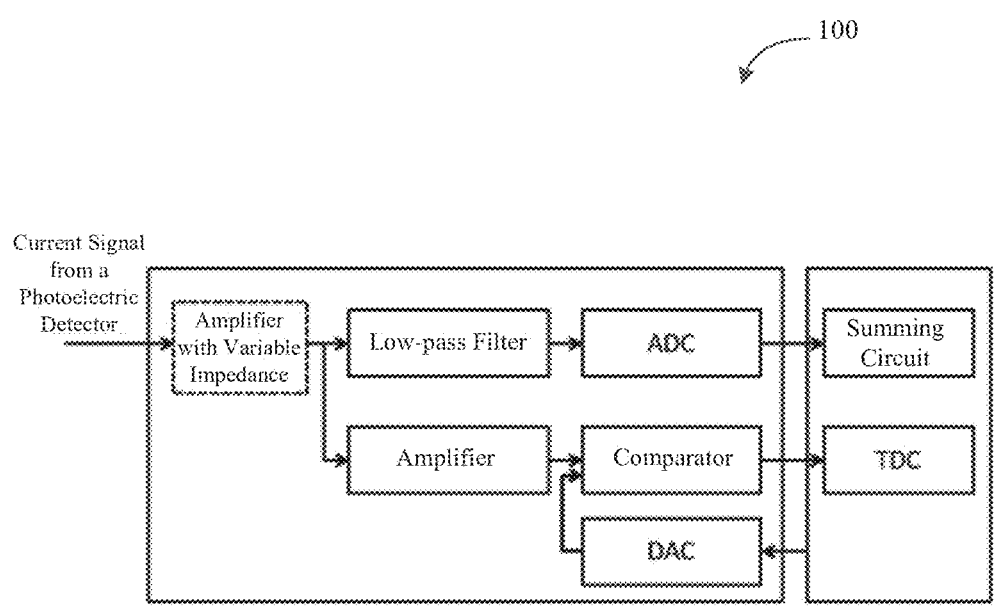
FIG. 1 illustrates a block diagram of a conventional and exemplary photon measurement front-end circuit.
Figure 2:
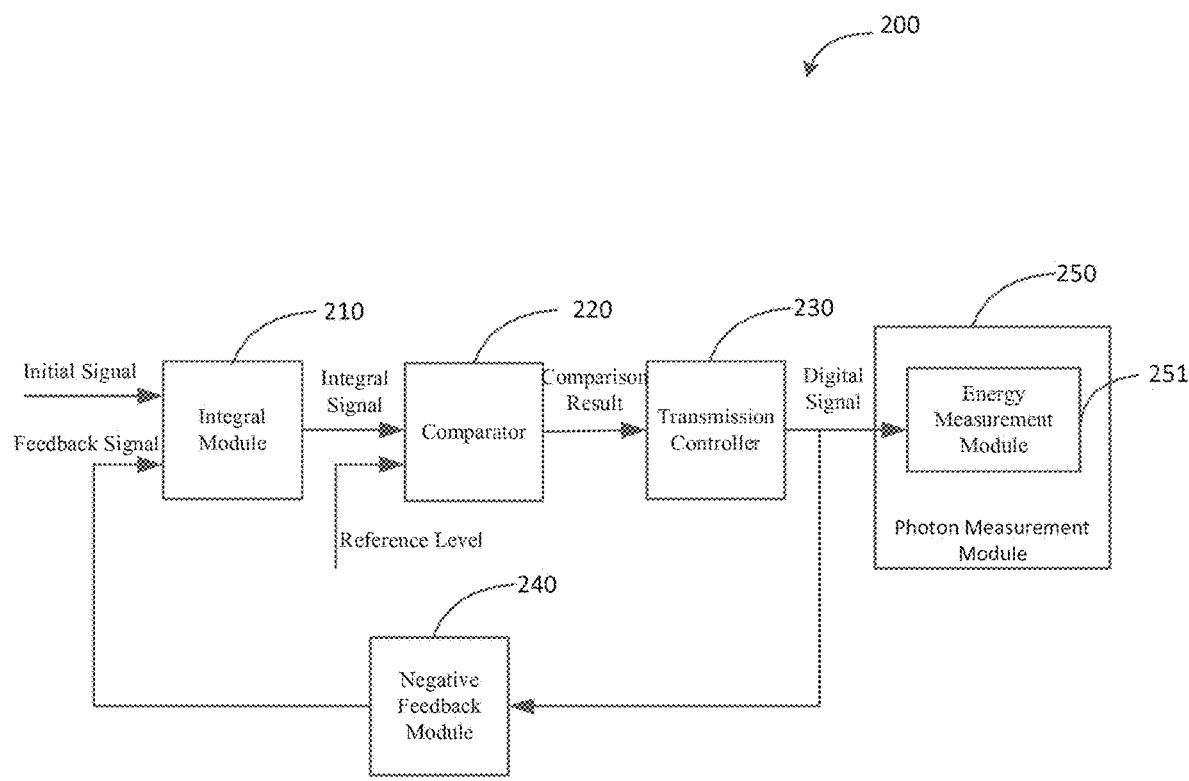
FIG. 2 illustrates a schematic block diagram of a photon measurement front-end circuit in accordance with an embodiment of the invention.

An aspect of the invention provides a photon measurement front-end circuit. In the following, the photon measurement front-end circuit provided by embodiments of the invention will be described with reference to FIGS. 2 to 9. FIG. 2 illustrates an exemplary block diagram of a photon measurement front-end circuit 200 in accordance with an embodiment of the invention.

As illustrated in FIG. 2, the photon measurement front-end circuit 200 comprises an integral module 210, a comparator 220, a transmission controller 230, a negative feedback module 240, and a photon measurement module 250.

The integral module 210 is connected to an output terminal of a photoelectric detector (not shown) and an output terminal of the negative feedback module 240. The integral module 210 is configured for receiving an initial signal from the photoelectric detector and a feedback signal from the negative feedback module, integrating a difference between the initial signal and the feedback signal, and outputting an integral signal.

Alternatively, the above photoelectric detector may be any suitable photoelectric detector, such as a SiPM, a photomultiplier tube (PMT), an avalanche photodiode (APD) and the like. A person skilled in the art will understand the following: in a PET system, a pair of gamma photons is generated when positron annihilation happens. When a scintillator is impacted by a gamma photon, an initial signal is output by the photoelectric detector. The initial signal is a pulse current signal. The photoelectric detector outputs the initial signal to the photon measurement front-end circuit 200, such that the photon measurement front-end circuit 200 can obtain energy and time information of the gamma photon by measuring the initial signal, thereby in turn obtaining information on the positron annihilation event.

The photon measurement front-end circuit 200 is a circuit including a negative feedback node and the feedback signal is fed to the integral module 210. At the same time, the integral module 210 further receives the initial signal from the photoelectric detector. Both the initial signal and the feedback signal are current signals, with opposite flowing directions. For example, if the initial signal flows from the integral module 210 to the photoelectric detector, the feedback signal may be set to flow from the negative feedback module 240 to the integral module 210. Therefore, what is actually input to the integral module 210 is the difference between the initial signal and the feedback signal, and the integral module 210 may perform an integral operation on the difference between the initial signal and the feedback signal. It is noted that the directions indicated by the arrows in FIG. 2 are transmission directions of the signals instead of flowing directions of the signals. The integral module 210 may be implemented by an analogue integral circuit, such as a filter circuit formed by a resistor and a capacitor. In the following the integral module 210 will be described in detail with reference to specific circuit examples, and will not be elaborated here.

As illustrated in FIG. 2, an input terminal of the comparator 220 is connected to an output terminal of the integral module 210, and the other input terminal of the comparator 220 is connected to a reference level. The comparator 220 is configured for comparing the integral signal with the reference level and generating a comparison result. As an example, a high level is output by the comparator 220 when the amplitude of the integral signal is higher than the reference level; and a low level is output by the comparator 220 when the amplitude of the integral signal is lower than or equal to the reference level. Therefore, the comparison result output by the comparator 220 has only two states of high level and low level. Generally, the initial signal output by the photoelectric detector is a pulse current signal varying with time. In this case, the integral signal may also be a signal varying with time. Therefore, the comparison result output by the comparator 220 is a signal varying with time and thus switching between two states of high level and low level.

An input terminal of the transmission controller 230 is connected to an output terminal of the comparator 220. The transmission controller 230 is configured for controlling transmission of the comparison result by use of a clock signal such that a digital signal is output, wherein a high level in the digital signal and with duration equal to a period of the clock signal represents a first logic level, and a low level in the digital signal and with duration equal to the period of the clock signal represents a second logic level. As described above, the comparison result is a signal varying with time and switching between two states of high level and low level. In the comparison result, the duration of the high level and the low level may vary in real time and thus indeterminable. Therefore, the transmission controller 230 may be used to make the duration of each continuous high level or low level to be an integer multiple of the period of the clock signal by quantizing time of the comparison result. Such quantization of time is equivalent to time discretization during AD conversion. Therefore, from the perspective of functionality, the combination of the comparator 220 and the transmission controller 230 may be regarded as a one-digit ADC. In the digital signal output by the transmission controller 230, a high level with duration equal to a period of the clock signal represents a first logic level, and a low level with duration equal to the period of the clock signal represents a second logic level. As an example, the first logic level may be a logic level 1, and the second logic level may be a logic level 0, then the digital signal is a series made of logic levels of "1" and "0". Assuming the frequency of the clock signal is 100 MHz, that is, the period thereof is 0.01 s, and then a single "1" or "0" lasts 0.01 s in the digital signal. Moreover, it can be understood that when multiple "1" or "0" are present, the duration of the multiple "1" or "0" is integer multiple of 0.01 s. The transmission controller 230 may be a register or a switch circuit controlled by the clock signal. Principle and structure of the circuit of the transmission controller 230 will be described later and will not be elaborated here.

An input terminal of the negative feedback module 240 is connected to an output terminal of the transmission controller 230. The negative feedback module 240 is configured for converting the digital signal into the feedback signal and feeding the feedback signal back to the integral module 210. The negative feedback module 240 may include a digital-analog convertor (DAC) for converting the digital signal to an analog signal. Specifically, the DAC may be a one-digit DAC, so as to convert the series formed by "1" and "0" output by the transmission controller 230 into an analog signal, for example, a voltage signal with amplitude varying with time. The negative feedback module 240 may further comprise a resistor. The DAC is connected to the input terminal of the integral module 210 via the resistor. As a result, a current signal flowing through the resistor is generated based on the voltage signal. The current signal is the feedback signal. The feedback signal may offset a part of the initial signal from the photoelectric detector, preventing the value of the integral signal output by the integral module 210 from being too large, so as to maintain a stable circuit. Moreover, as the feedback signal constantly offsets the initial signal from the photoelectric detector, the accumulation of the feedback signal caused by the initial signal may be regarded as the accumulation of the initial signal from the photoelectric detector. At the same time, the amplitude of the feedback signal is proportional to that of the digital signal.

Therefore. When the duration of the initial signal ends and the amplitude of the feedback signal is constantly maintained at zero (that is, the negative feedback on the initial signal has been stopped), the digital signal may be used to compute the energy of the photon. It is noted that the value of the feedback signal should not be too large or too small. If the value of the feedback signal is too large, the initial signal is offset too fast, which may make the error included in the digital signal increased, thereby affecting the measurement accuracy. On the contrary, if the value of the feedback signal is too small, the initial signal is offset too slow, making it impossible to decrease the value of the integral signal in time, which may also affect the measurement accuracy. The amplitude of the feedback signal may be determined as needed, which will not be defined in the invention.

The photon measurement module 250 comprises an energy measurement module 251. An input terminal of the energy measurement module 251 is connected to the output terminal of the transmission controller 230. The energy measurement module 251 is configured for measuring, based on the digital signal, energy of the photon detected by the photoelectric detector. The digital signal comprises energy information which may reflect energy of the photon detected by the photoelectric detector. The energy measurement module 251 can compute or deduce the energy of the photon by performing an operation (such as summation) on the digital signal. It can be understood that the energy measurement module 251 can obtain the absolute value of the energy of the photons based on the digital signal, or it can only obtain the relative value of the energy of the photon.

The photon measurement front-end circuit as provided by the embodiment of the invention is of a simple circuit structure, and it uses no or fewer active devices such as amplifiers, ADCs and so on. Therefore, the technical solution provided by the invention requires less circuit recourses; it is also of lower cost and power consumption. Moreover, different from the conventional art directly sampling a pre-processed initial signal from a photoelectric detector by an ADC, the photon measurement front-end circuit of the invention integrates the initial signal and processes the integral signal to obtain the energy information of the photon. Therefore, the energy measurement is not influenced by the starting time of the initial signal. Moreover, it can be understand that the energy and time measurement in the conventional art requires the ADC to be of higher precision and higher conversion speed. In contrast, as no or fewer ADCs are used in the circuit of the invention, the requirement on the precision and conversion speed of ADC is lower.

Optionally, the energy measurement module 251 may comprise a counter (not shown), which is configured for counting the first logic level so as to measure the energy of the photon. That is to say, the energy measurement may be performed by counting the number of "1" in the digital signal. For example, if the digital signal includes 500 "1", then the energy of the photon may be taken as 500.

Optionally, the energy measurement module 251 may comprise an adder (not shown), which is configured for summing the first logic level so as to measure the energy of the photon. That is to say, the "1" in the digital signal may be summed directly, and then the sum may be taken as the energy of the photon. For example, if the final sum is 300, then the energy of the photon may be taken as 300.

The methods of measuring energy by counting or summing the first logic levels are simple, convenient and efficient.

Optionally, the energy measurement module 251 may comprise a control unit (not shown). The control unit is connected to the negative feedback module and configured for controlling the negative feedback module 240 to convert the digital signal into feedback signals of different amplitude at different time periods. Optionally, the energy measurement module 251 may further comprise an adder and a multiplier (not shown). The control unit may further be configured for allocating a weighting factor to the first logic level within a specific time period based on the amplitude of the feedback signal in the specific time period, and the adder and the multiplier are configured for measuring the energy of the photon by weighted summing the first logic level according to the weighting factors. As an example, the negative feedback module 240 may output a feedback signal of 1.8 mA in the starting period (considered as the first period) after the initial signal from the photoelectric detector is input thereto, and output a feedback signal of 1 mA in a subsequent period (considered as the second period) after the initial signal from the photoelectric detector is input thereto. Therefore, to the transmission controller 230, the "1" in the digital signal output in the first period and the "1" in the digital signal output in the second period correspond to different photon energy. Therefore, a weighting factor of 1.8 is allocated to the "1" in the digital signal output in the first period, and a weighting factor of 1 is allocated to the "1" in the digital signal output in the second period, and the weighted summing is performed on the "1" in the digital signal according to the weighting factors. The result of the weighted summing may be taken as the energy measurement result. It can be understood that the weighting factors may be determined according to the ratio between the feedback signals in different periods. For example, for the above example, the weighting factors for the first and second periods may respectively be 9 and 5. It may be understood that the negative feedback module 240 may include a DAC and multiple resistors with different resistance. As an example, the DAC may respectively output two voltage signals of the same amplitude in the first and second periods. The two voltage signals may pass two resistors of different resistances or only one of the two voltage signals passes a resistor, such that the feedback signals (which are current signals) input to the integral module 210 from the negative feedback module 240 are different in the first and second periods. According to another example, the DAC may also output two voltage signals of the same amplitude in the first period. The two voltage signals may respectively pass two resistors of different resistances. while in the second period only one of the two signals output in the first period is output, such that the feedback signals (which are current signals) input to the integral module 210 from the negative feedback module 240 are different in the first and second periods. In the photon measurement front-end circuit, feedback signals of different amplitude may be used with time as needed, thereby adjusting the speed and accuracy of the photon measurement. Thus the objective of considering both the measurement efficiency and accuracy are achieved at the same time.

Figure 3:
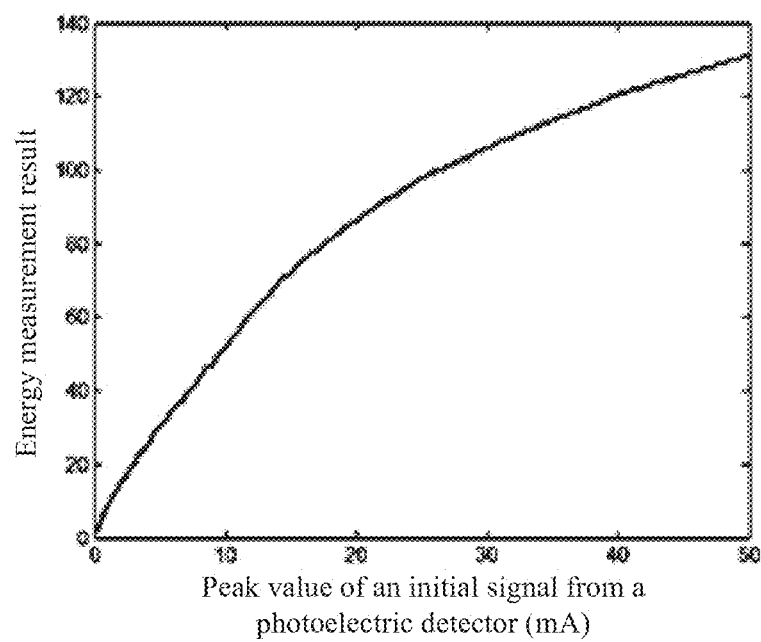
FIG. 3 illustrates a graph of a conversion function between an energy measurement result and a peak value of an initial signal from a photoelectric detector, in accordance with an embodiment of the invention.

Optionally, the energy measurement module 251 is further configured for correcting a conversion function between an energy measurement result and a peak value of the initial signal by use of a look-up table, and for correcting the energy measurement result by use of the corrected conversion function. The peak value of the initial signal is proportional to the actual energy of the photon; therefore, the conversion function between the energy measurement result and the peak value of the initial signal reflects a conversion relationship between the energy measurement result and the actual energy of the photon. FIG. 3 illustrates a graph of a conversion function between the energy measurement result and the peak value of the initial signal from the photoelectric detector, in accordance with an embodiment of the invention. As illustrated in FIG. 3, the conversion function may exhibit non-linearity to a certain extent. Therefore, based on actual needs, a digital logic circuit including FPGA, such as a look-up table, may be used to correct (compensate or adjust) the conversion function between the energy measurement result and the peak value of the initial signal. After that, the corrected conversion function may be used to correct the energy measurement result. The accuracy of the energy measurement may be improved by correcting the conversion function and using the corrected conversion function to correct the energy measurement result.

Figure 4:
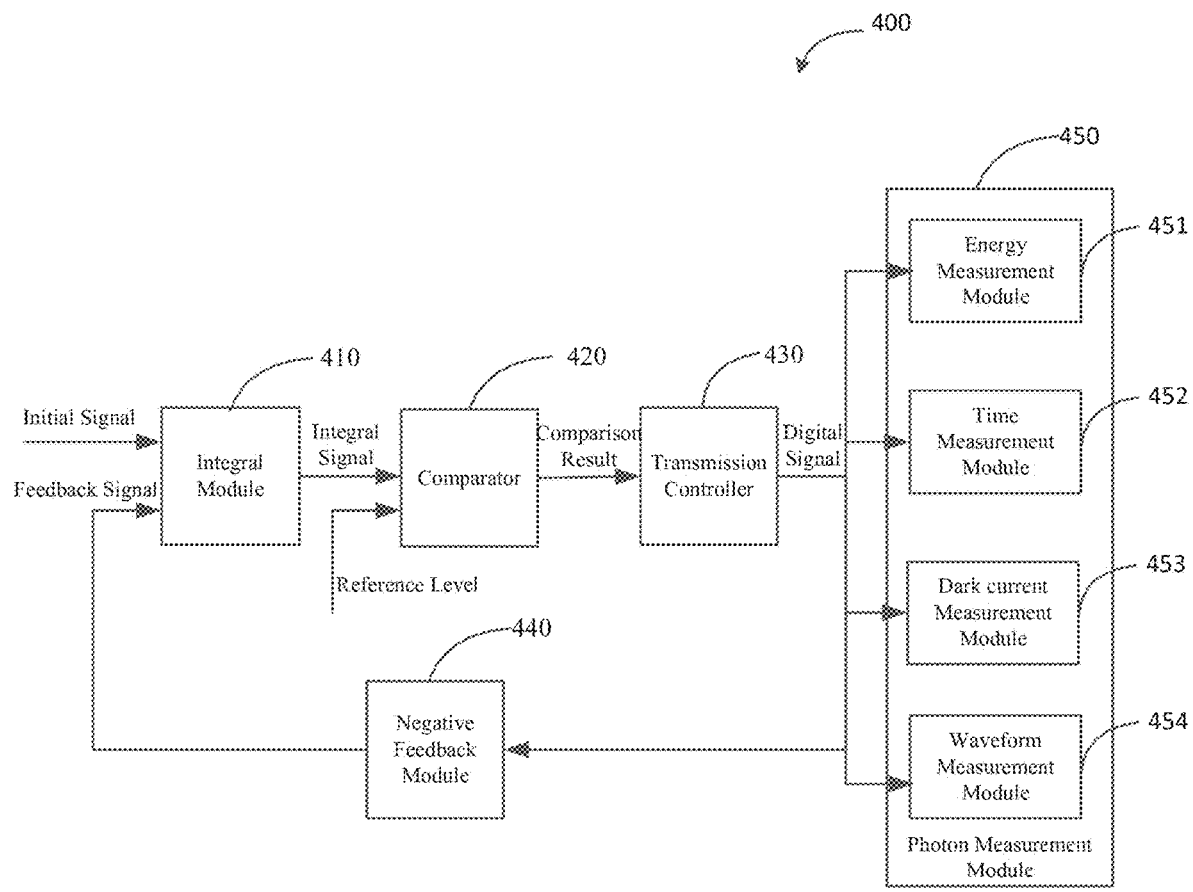
FIG. 4 illustrates an schematic block diagram of a photon measurement front-end circuit in accordance with an embodiment of the invention.

FIG. 4 illustrates an exemplary block diagram of a photon measurement front-end circuit 400 in accordance with an embodiment of the invention. An integral module 410, a comparator 420, a transmission controller 430, a negative feedback module 440 and an energy measurement module 451 illustrated in FIG. 4 are the same as the integral module 210, the comparator 220, the transmission controller 230, the negative feedback module 240 and the energy measurement module 251 illustrated in FIG. 2 and will not be elaborated here.

Optionally, the photon measurement module 450 may further comprise a time measurement module 452. An input terminal of the time measurement module 452 is connected to an output terminal of the transmission controller 430, and the time measurement module 452 is configured for measuring time for the photon by use of a digital signal. An occurring time of a rising edge of the digital signal may reflect time information of the photon. The time measurement module 452 may measure the occurring time of the rising edge of the digital signal form the transmission controller 430. A method adopted is to use a clock of the digital system to directly record the occurring time of the rising edge. This method is simple, convenient and easy to be implemented. The time measurement module 452 may use a high-precision analog TDC or digital TDC (such as a digital TDC based on an FPGA delay line) to measure the time of the rising edge of the digital signal precisely. Such a method may improve the accuracy of the time measurement.

Optionally, the input terminal of the time measurement module 452 may be further connected to an output terminal of the comparator 420, so as to perform the time measurement on the photon based on a comparison result. The comparison result is a signal not quantized in terms of time by the transmission controller 430; therefore, by directly measuring the time information of the comparison result, more accurate time information of the photon may be obtained. The time measurement module 452 may measure the occurring time of a rising edge of the comparison result from the comparator 420. A method adopted is to use a clock of the digital system to directly record the occurring time of the rising edge. The time measurement module 452 may use a high-precision analog TDC or digital TDC (such as a digital TDC based on an FPGA delay line) to measure the time of the rising edge of the comparison result precisely.

It can be understood that the time measurement module 452 may be implemented in the photon measurement module 450, so as to measure the time information of the photon.

Moreover, the initial signal output by the photoelectric detector may be split into two signals. One of the signals may be used for measuring the energy information of the photon in the photon measurement front-end circuit provided by the invention. The other signal may be used for measuring the time information of the photon in a conventional time measurement circuit, which will not be defined by the invention.

Figure 5:
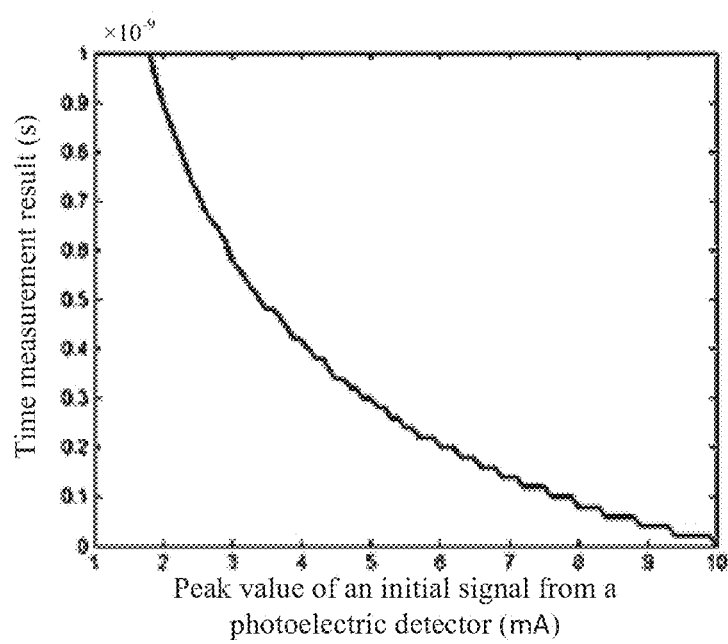
FIG. 5 illustrates a graph of relationship between an time measurement result and a peak value of an initial signal from a photoelectric detector, in accordance with an embodiment of the invention.

Optionally, the time measurement module 452 may be further configured for correcting the time measurement result based on the energy measurement result from the energy measurement module 451. FIG. 5 illustrates a relationship graph between a time measurement result and a peak value of an initial signal from a photoelectric detector, in accordance with an embodiment of the invention. As illustrated in FIG. 5, time measured for initial signals with the same starting time is different when the peak values thereof are different. As an example, when the peak value of the initial signal is in a range of 4 to 6 mA, the measured time fluctuates in a range of 200 ps. The peak value of the initial signal may be calculated according to the energy measurement result. For example, it may be calculated based on the conversion function between the energy measurement result and the peak value of the initial signal. Therefore, the energy measurement result from the energy measurement module 451 may be used to correct the time measurement result, thereby further improving the accuracy of the time measurement.

Optionally, the photon measurement module 450 may further comprise a dark current measurement module 453. An input terminal of the dark current measurement module 453 is connected to an output terminal of the transmission controller 430, and the dark current measurement module 453 is configured for measuring a dark current based on the digital signal. The dark current measurement module 453 may measure the dark current by performing operation on the digital signal from the transmission controller 430. For example, the value of the dark current may be measured by counting the number of "1" in the digital signal in a unit time when no effective pulse event is present. The value of the dark current is proportional to the number of "1" in the digital signal in the unit time. The above effective pulse event refers to an event to generate a pulse current signal in the photoelectric detector caused by a gamma photon.

Optionally, the energy measurement module 451 may be further configured to correct the energy measurement result according to the dark current measurement result from the dark current measurement module 453. The again of a photoelectric detector (especially a SiPM) is significantly influenced by temperature. Taking the SiPM as an example, when the temperature rises, the gain of the SiPM and the number of the dark current event (the value of the dark current) increase synchronously. Therefore, the energy measurement result may be corrected according to the dark current measurement result. For example, a relationship curve between the gain of the SiPM and the dark current may be used to perform a weighted calculation on the energy measurement result, thereby achieving the objective of compensating the gain change caused by the temperature.

When the SiPM is used as the photoelectric detector at the front-end, the presence of the detector dark current may cause an intermittent low-amplitude pulse current. The digital signals generated by the effective pulse event and the dark current event at the output terminal of the transmission controller 430 have different characteristics. The effective pulse event has larger energy, and there are more "1" in the sequence of the output digital signal. While the dark current event has smaller energy, and there are fewer "1" in the sequence of the output digital signal. Therefore, the number of the dark current events may be calculated from the sequence characteristic of the digital signal. The number of short "1" sequence output by the transmission controller 430 in a unit time (that is the frequency of short "1" sequence) is calculated, in a gap between two neighboring effective pulse events, and then the value of the dark current may be estimated according to the number of short "1" sequence in the unit time. Then, the temperature of the photoelectric detector is obtained according to the correspondence relationship between the value of the dark current and the temperature, and the gain change caused by the temperature change is compensated by according to the relationship between the temperature and the SiPM gain.

Figure 6:
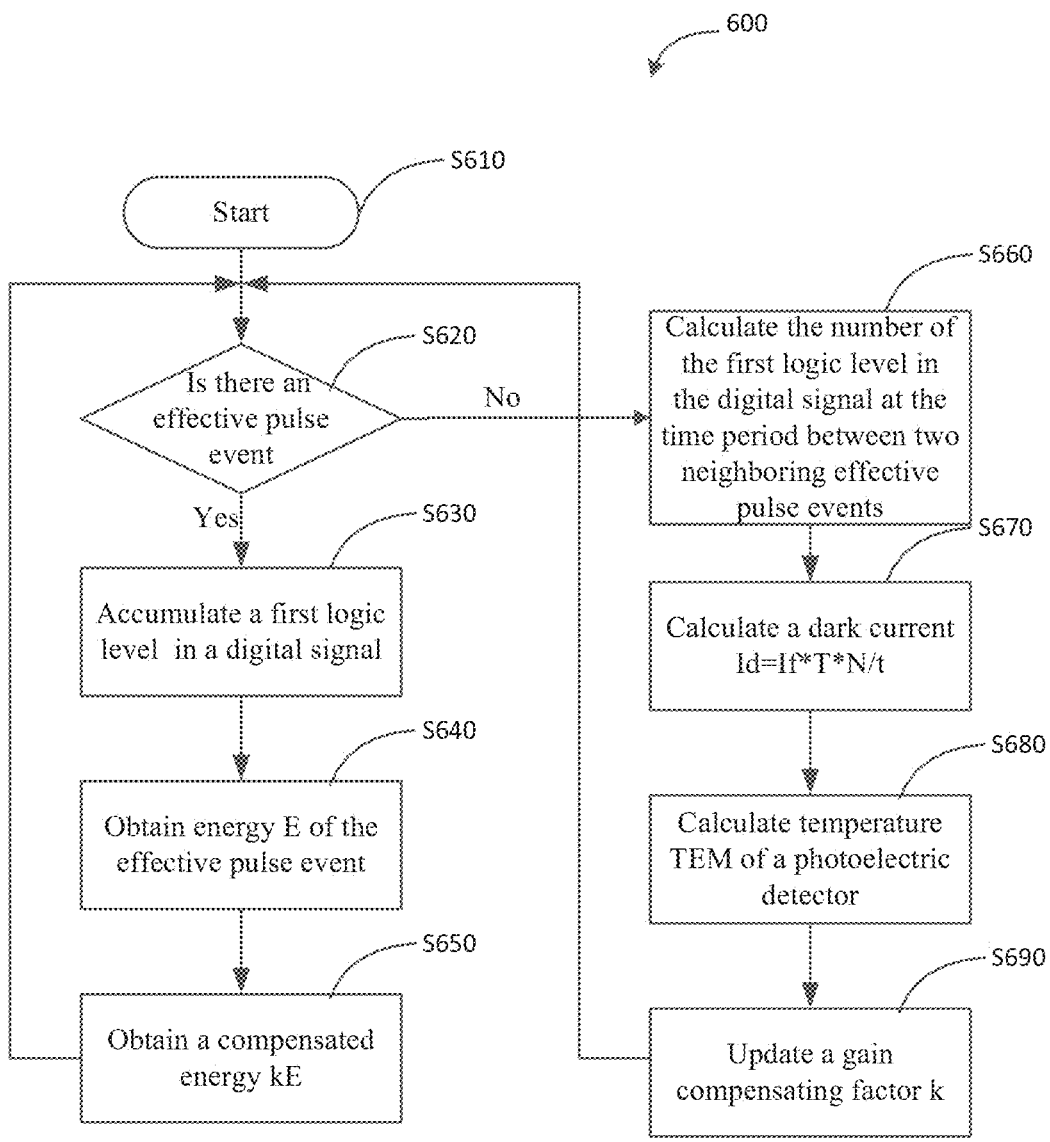
FIG. 6 illustrates a flow chart for correcting an energy measurement result according to a dark current measurement result in accordance with an embodiment of the invention.

In the following, a method for measuring the dark current and correcting the energy measurement result according to the dark current measurement result will be described with reference to FIG. 6. FIG. 6 illustrates a flow chart of a method 600 for correcting the energy measurement result according to the dark current measurement result, in accordance with an embodiment of the invention. The method 600 starts from step S610. In step S620, it determines whether there is an effective pulse event. If there is an effective pulse event, the method 600 proceeds to step S630; otherwise, the method 600 proceeds to step S660. In step S630, the first logic level ("1") in a digital signal is accumulated to obtain the energy measurement result when there is the effective pulse event. Next, at step S640, the energy E of the effective pulse event is obtained according to the energy measurement result. In the following, at step S650, the energy E is compensated by use of the gain compensating factor k, to obtain a compensated energy kE, which is the needed energy of the photon. It can be understood that an initial value may be set for the gain compensating factor k. Next, the method 600 may end or return to step S620, so as to correct the energy measurement result of the subsequent effective pulse event. If it is determined that there is no effective pulse event at step S620, the method 600 proceeds to step S660, the number of the first logic level ("1") in the digital signal at the time period between two neighboring effective pulse events is calculated. Next, at step S670, the value of the dark current is calculated according to the equation of Id=If*T*N/t. In the above equation, Id is an average value of the dark current, If is the value of the feedback signal (which is a current signal), T is the period of the feedback signal (that is duration of a single first logic level), t is a time period between two neighboring effective pulse events, and N is the number of the first logic level in the time period t. Next, at step S680, the temperature TEM of the photoelectric detector is calculated according to the correspondence relationship between the dark current and the temperature. Then at step S690, the gain compensating factor k is updated according to the relationship between the temperature TEM and the gain of the photoelectric detector. After that, it returns step S620.

Figure 7:
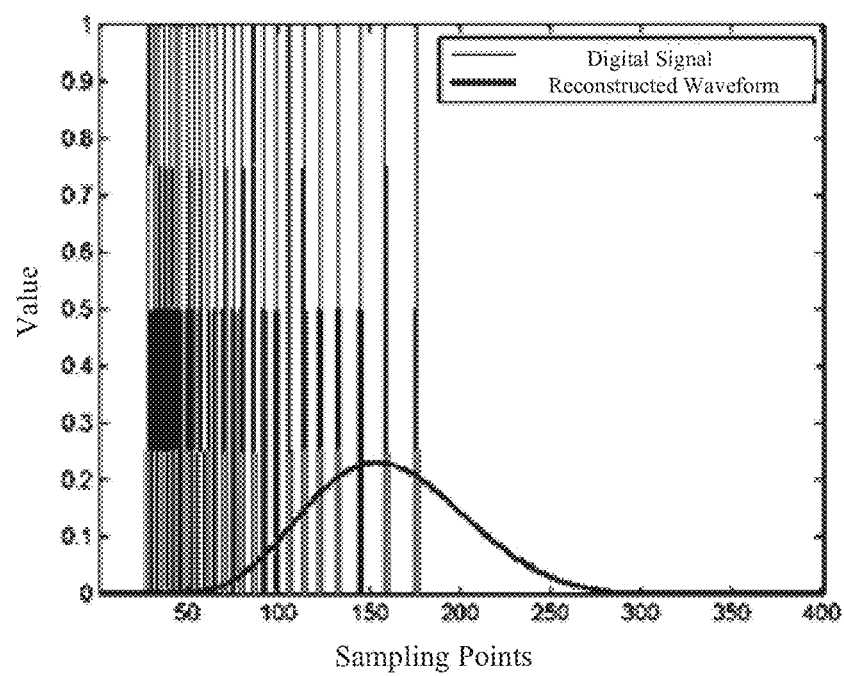
FIG. 7 illustrates a wave reconstruction result in accordance with an embodiment of the invention.

Referring back to FIG. 4, optionally, the photon measurement module 450 may further comprise a waveform measurement module 454. An input terminal of the waveform measurement module 454 is connected to an output terminal of the transmission controller 430, and the waveform measurement module 454 is configured for performing waveform reconstruction and waveform measurement on the initial signal by use of a digital signal. The waveform measurement module 454 performs waveform reconstruction and measurement on the initial signal from the photoelectric detector by performing digital signal processing on the digital signal from the transmission controller 430. As an example, the waveform measurement module 454 may reconstruct the waveform of the initial signal by way of digital low-pass filtering. The measurement of the waveform is dependent on specific applications. For example, in some circumstances, it is desirable to use a slope of a falling edge of the waveform to measure the response depth in the scintillator of the photoelectric detector made by the gamma photon. In this case, the slope of the falling edge of the reconstructed waveform may be measured by measuring the falling amplitude thereof in a unit time. FIG. 7 illustrates a reconstructed waveform according to an embodiment of the invention. As shown in FIG. 7, the waveform with amplitude switching between 0 and 1 is the waveform of the digital signal output by the transmission controller 430, and the waveform with amplitude smaller than 0.3 is the reconstructed waveform. The digital low-pass filter used here is a 5-order Butterworth digital filter. It should be understood that the 5-order Butterworth digital filter just is an example of the digital low-pass filters and is not limitative to the invention. The invention may also adopt any other suitable digital low-pass filters.

Figure 8:
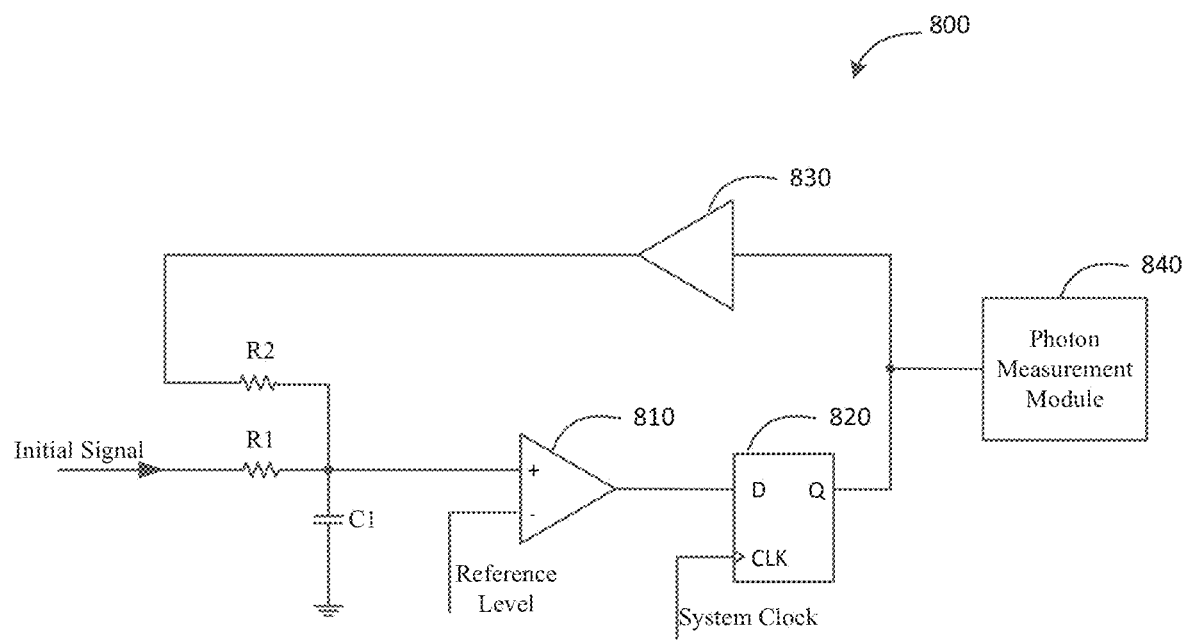
FIG. 8 illustrates an exemplary circuit diagram of a photon measurement front-end circuit in accordance with an embodiment of the invention.

In the following, the circuit structure and principle in the invention will be further described with reference to FIGS. 8 and 9. FIG. 8 illustrates a schematic circuit diagram of a photon measurement front-end circuit 800 in accordance with an embodiment of the invention.

In the embodiment illustrated in FIG. 8, an integral module in the photon measurement front-end circuit 800 is a low-pass filter comprising a resistor R1 and a capacitor C1. Alternatively, the low pass filter may further comprise a unidirectional conductivity diode (i.e., a diode having a unidirectional conductivity) connected to the resistor R1 in series. Introducing the diode into the low-pass filter may improve the property of the photon measurement front-end circuit 800. An initial signal (an analog signal) generated by a photoelectric detector such as a PMP or SiPM is input to the low-pass filter via the resistor R1. The negative feedback module comprises of a DAC 830 and a resistor R2. The DAC 830 input a feedback signal to the low-pass filter via the resistor R2. Optionally, the negative feedback module may further comprise a unidirectional conductivity diode (i.e., a diode having a unidirectional conductivity) connected to the resistor R2 in series. Introducing the unidirectional conductivity diode into the negative feedback module may improve the property of the photon measurement front-end circuit 800. The initial value of the feedback signal is 0. The initial signal and the feedback signal are of opposite directions, therefore, an integral of the difference between the initial signal and the feedback signal is obtained at the output terminal of the low pass filter, and that is, an integral signal is obtained. In the photon measurement front-end circuit 800, the comparator 810, the transmission controller 820, the DAC 830 and the photon measurement module 840 may be implemented by an FPGA. It can be understood that the comparator 810, the transmission controller 820 and the DAC 830 may also be realized by separate analog or digital circuits.

In FIG. 8, the digital part of the photon measurement front-end circuit 800 is an FPGA with a differential input pin. An output of the low pass filter is connected to an in-phase terminal of the differential input pin of the FPGA. In the meanwhile, an anti-phase terminal of the differential input pin is connected to a reference level. The reference level may be adjusted according to properties of the initial signal output by the photoelectric detector, so as to realize better energy, time, dark current and waveform measurement results. In the FPGA, the transmission controller 820 is a register, which latches a comparison result output by the comparator 810 with a certain frequency. The digital signal output by the register passes through one digital pin of the FPGA (DAC 830) and is converted to an analog signal. The analog signal is fed back to the input terminal of the low pass filter via the resistor R2. At the same time, the digital signal output by the register is transmitted to the photon measurement module 840 in the FPGA for the energy, time, dark current or waveform measurement.

As stated above, when the initial signal is input to the integral module at the beginning, the initial value of the feedback signal is 0. It is equivalent to having only one input of the initial signal, and the integral signal equals to the integral of the initial signal. With the progress of time, the integral signal becomes larger and larger. When the amplitude of the integral signal is larger than the reference level, the comparator 810 output a logic level of "1". The transmission controller 820 is a register, for example, a D flip-flop, which is controlled by a system clock. When a rising edge of the system clock occurs, the output terminal of the register follows the input terminal thereof and output the logic level "1". The logic level "1" is converted to an analog signal by the DAC 830, for example into a voltage signal of 1.8V, which is then fed back to the input terminal of the integral module and forms the feedback signal. Due to the negative feedback effect, the integral signal starts to decrease. When it becomes smaller than the reference level, the comparator 810 output a logic level of "0". When a subsequent rising edge of the system clock occurs, the output terminal of the register outputs a "0", making the feedback signal to "0" as well. The integral module 810 may continue to integrate the initial signal from the photoelectric detector.

The implementation as illustrated in FIG. 8 has the following advantages. The circuit structure is simple; there is no need of active devices such as amplifiers or ADCs; little internal resource of the FPGA is needed. Therefore, the photon measurement front-end circuit is of low cost and power consumption. Moreover, the energy measurement of the photon measurement front-end circuit is not affected by the starting time of the pulse.

Figure 9:
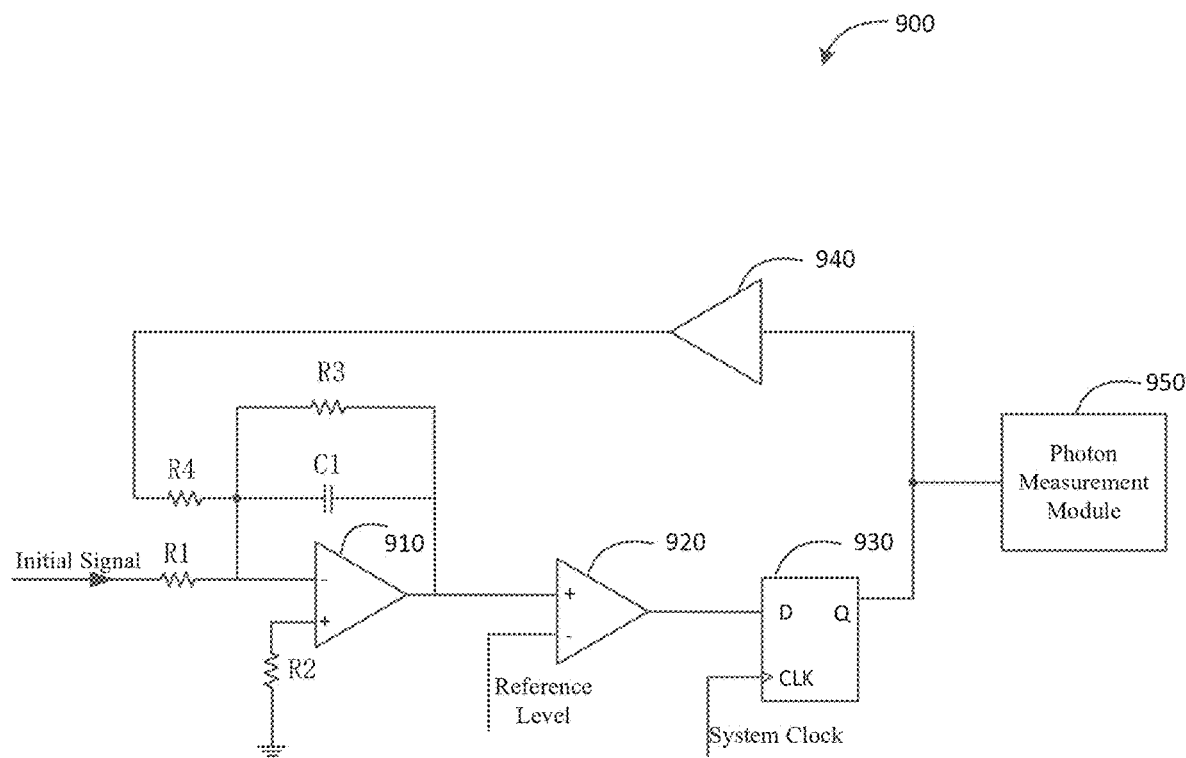
FIG. 9 illustrates an exemplary circuit diagram of a photon measurement front-end circuit in accordance with another embodiment of the invention.

FIG. 9 illustrates an exemplary circuit diagram of a photon measurement front-end circuit 900 in accordance with another embodiment of the invention. An integral module 910 of the photon measurement front-end circuit 900 comprises resistors R1, R2 and R3, a capacitor C1 and an operation amplifier 910. Optionally, the integral module 910 may further comprises a unidirectional conductivity diode serially connected to the resistors R1, R2 and R3. The digital part of the circuit is an FPGA with a differential input pin. The output of the filter is connected to an in-phase terminal of the digital differential input pin of the FPGA. An anti-phase terminal of the digital differential input pin is connected to a reference level. The reference level may be adjusted according to properties of the initial signal output by the photoelectric detector, so as to realize better energy, time, dark current and waveform measurement results. In the FPGA, the transmission controller 930 is a register, which latches a comparison result output by the comparator 920 with a certain frequency. The digital signal output by the register passes through one digital pin of the FPGA (DAC 940), and is converted to an analog signal. The analog signal is fed back to the input terminal of the low pass filter via the resistor R4. At the same time, the digital signal output by the register is transmitted to the photon measurement module 950 in the FPGA for the energy, time, dark current or waveform measurement.

The photon measurement front-end circuit 900 illustrated in FIG. 9 operates in a similar way to the photon measurement front-end circuit 800 as shown in FIG. 8. The implementation of FIG. 9 may be understood by a person skilled in the art with reference to the description for the implementation of FIG. 8 and will not be elaborated here.

It is noted that the resistance of the resistor R1 of FIG. 9 may be adjusted according to the character of the initial signal output by the photoelectric detector. The resistor R1 may be removed (a short circuit). The resistor R1 may be replaced with a capacitor for breaking direct current. The resistor R1 may also be replaced with a unidirectional conductivity diode. The resistance of the resistor R3 of FIG. 9 may be adjusted as needed. The resistor R3 may be removed (an open circuit). Similarly, the resistance of the resistor R4 of FIG. 9 may be adjusted according to the character of the initial signal output by the photoelectric detector. The resistor R4 may be removed (a short circuit). The value of the capacitor C1 may be adjusted according to the amplitude range of the initial signal. Moreover, in the paths where there are the resistors R1, R2, R3, R4 and the reference level in FIG. 9, unidirectional conductivity diodes can be added as needed, so as to improve the performance of the circuit.

The implementation as illustrated in FIG. 9 has the following advantages. The circuit structure is simple, and little internal resource of the FPGA is needed. Therefore, the photon measurement front-end circuit is of low cost and power consumption. Moreover, energy conversion is of high procession and good linearity. The energy measurement is not affected by the starting time of the pulse. The time measurement and the dark current measurement are of high precision. Anti-noise performance is good. The requirement on precision of components, especially the capacitor, is low; therefor it is suitable for large scale manufacture.

Based on the technical solution of FIG. 8, a person skilled in the art can use an FPGA with regular low power consumption and low cost and some passive components (resistors, capacitors, diodes) to realize the measurement of up to hundreds of signals from a photoelectric detector. Based on the technical solution of FIG. 9, a person skilled in the art can use a regular low power consumption and low cost FPGA, some active amplifiers (one for each channel) and some passive components (resistors, capacitors, diodes) to realize the high-precision measurement of up to hundreds of signals from a photoelectric detector.

For a photoelectric detector with multiple signal channels, in some circumstances, signals in different channels need to be combined. The invention provides the following methods for reducing the signal channels. Two methods may be used, (1) taking the implementation of FIG. 9 as an example, multiple initial signals may be connected to the anti-phase terminal of the same operational amplifier via resistors, thereby reducing the number of signal channels directly; (2) for many applications, multiple integral signals may be combined by use of an OR gate inside the FPGA. Thus it is possible for multiple signal channels to share one high precision analog TDC or digital TDC (such as a digital TDC based on an FPGA delay line).

The above FPGA is used as an example to illustrate the specific implementations of the invention. It is noted that the FPGA is not a necessary component for the construction of the invention. The functional modules of the invention realized by use of the FPGA may also be realized by digital circuits formed by discrete components. The functional modules of the invention realized by use of the FPGA may also be realized by Application Specific Integrated Circuits (ASICs).

Though the principle and application of the invention are described with reference to the PET system, it can be understood that the invention is not limited to that. The photon measurement front-end circuit provided by the invention may also be used to a SPECT system, an X-ray computed tomography (X-CT) system or any other suitable high energy photon measurement system.

The invention has been described with reference to the above embodiments. However, it can be understood that the above embodiments are for illustrative purposes only and are not intended to limit the invention to the scope of the described embodiments. Moreover, it can be understood by those skilled in the art that, the invention is not limited to the above embodiments, more variants and modifications may be made in accordance with the teaching for the invention, and the variants and modifications are all within the scope claimed in the invention. The protection scopes of the disclosure are defined by the accompanying claims.

What is claimed is:

1. A photon measurement front-end circuit comprising an integral module, a comparator, a transmission controller, a negative feedback module and a photon measurement module, wherein the integral module is connected to an output terminal of a photoelectric detector and an output terminal of the negative feedback module and configured for receiving an initial signal from the photoelectric detector and a feedback signal from the negative feedback module, integrating a difference between the initial signal and the feedback signal, and outputting an integral signal;

an input terminal of the comparator is connected to an output terminal of the integral module and the other input terminal of the comparator is connected to a reference level, the comparator is configured for comparing the integral signal with the reference level and generating a comparison result;

an input terminal of the transmission controller is connected to an output terminal of the comparator, the transmission controller is configured for controlling transmission of the comparison result by use of a clock signal such that a digital signal is output, wherein a high level in the digital signal and with duration equal to a period of the clock signal represents a first logic level, and a low level in the digital signal and with duration equal to the period of the clock signal represents a second logic level;

an input terminal of the negative feedback module is connected to an output terminal of the transmission controller, the negative feedback module is configured for converting the digital signal into the feedback signal and feeding the feedback signal back to the integral module;

the photon measurement module comprises an energy measurement module, an input terminal of the energy measurement module is connected to the output terminal of the transmission controller, the energy measurement module is configured for measuring, based on the digital signal, energy of a photon detected by the photoelectric detector.

2. The photon measurement front-end circuit of claim 1, wherein the energy measurement module is further configured for correcting a conversion function between an energy measurement result and a peak value of the initial signal by use of a look-up table, and correcting the energy measurement result by use of the corrected conversion function.

3. The photon measurement front-end circuit of claim 1, wherein the photon measurement module further comprises a time measurement module, an input terminal of the time measurement module is connected to the output terminal of the comparator, and the time measurement module is configured for measuring time for the photon based on the comparison result.

4. The photon measurement front-end circuit of claim 3, wherein the time measurement module is further configured for correcting a time measurement result based on an energy measurement result from the energy measurement module.

5. The photon measurement front-end circuit of claim 1, wherein the photon measurement module further comprises a time measurement module, an input terminal of the time measurement module is connected to the output terminal of the transmission controller, and the time measurement module is configured for measuring time for the photon based on the digital signal.

6. The photon measurement front-end circuit of claim 5, wherein the time measurement module is further configured for correcting a time measurement result based on an energy measurement result from the energy measurement module.

7. The photon measurement front-end circuit of claim 1, wherein the photon measurement module further comprises a dark current measurement module, an input terminal of the dark current measurement module is connected to the output terminal of the comparator, and the dark current measurement module is configured for measuring a dark current based on the digital signal.

8. The photon measurement front-end circuit of claim 7, wherein the energy measurement module is further configured for correcting an energy measurement result according to a dark current measurement result from the dark current measurement module.

9. The photon measurement front-end circuit of claim 1, wherein the photon measurement module further comprises a waveform measurement module, an input terminal of the waveform measurement module is connected to the output terminal of the transmission controller, and the waveform measurement module is configured for performing waveform reconstruction and waveform measurement on the initial signal based on the digital signal.

10. The photon measurement front-end circuit of claim 9, wherein the waveform measurement module performs the waveform reconstruction on the initial signal by way of digital low-pass filtering.

11. The photon measurement front-end circuit of claim 1, wherein the energy measurement module comprises a counter configured for counting the first logic level so as to measure the energy of the photon.

12. The photon measurement front-end circuit of claim 1, wherein the energy measurement module comprises an adder, which is configured for summing the first logic level so as to measure the energy of the photon.

13. The photon measurement front-end circuit of claim 1, wherein the energy measurement module comprises a control unit connected to the negative feedback module, the control unit is configured for controlling the negative feedback module to convert the digital signal into feedback signals of different amplitude at different time periods.

14. The photon measurement front-end circuit of claim 13, wherein the energy measurement module further comprises an adder and a multiplier, the control unit is further configured for allocating a weighting factor to the first logic level within a specific time period based on the amplitude of the feedback signal in the specific time period, and the adder and the multiplier are configured for measuring the energy of the photon by weighted summing the first logic level according to the weighting factors.

15. The photon measurement front-end circuit of claim 1, wherein the integral module is a low-pass filter comprising a resistor and a capacitor.

16. The photon measurement front-end circuit of claim 15, wherein the low-pass filter further comprises a unidirectional conductivity diode connected to the resistor in series.

17. The photon measurement front-end circuit of claim 1, wherein the integral module comprises a resistor, a capacitor and an operation amplifier.

18. The measurement front-end circuit of claim 17, wherein the integral module further comprises a unidirectional conductivity diode connected to the resistor in series.

19. The photon measurement front-end circuit of claim 1, wherein the transmission controller is a register.

20. The photon measurement front-end circuit of claim 1, wherein the comparator, the transmission controller and the photon measurement module are implemented by use of a field programmable logic array.

\* \* \* \* \*